United States Patent [19]

Nilsson et al.

[11] 3,937,152

[45] Feb. 10, 1976

[54] OSCILLATION SENSITIVE VEHICLE MOTOR CONTROL

[75] Inventors: Lars-Olof Nilsson; Bo Söderberg; Fredrik Schmiterlow, all of Vasteras, Sweden

[73] Assignee: Allmanna Svenska Elektriska Aktiebolaget, Vasteras, Sweden

[22] Filed: Oct. 18, 1973

[21] Appl. No.: 407,508

[30] Foreign Application Priority Data
Mar. 9, 1973 Sweden............................ 7303307

[52] U.S. Cl................................. 105/61; 340/261
[51] Int. Cl.²..................................... G08B 21/00
[58] Field of Search ...... 318/311, 312, 315; 340/65, 340/261; 246/182 C; 105/1 A, 1 R, 61; 180/103; 73/71.4, DIG. 1

[56] References Cited
UNITED STATES PATENTS

| 1,729,800 | 10/1929 | Scott..................................... 340/65 |
| 2,799,015 | 7/1957 | Bell...................................... 340/261 |
| 2,951,366 | 9/1960 | Mark et al. ........................... 73/71.4 |
| 3,560,759 | 2/1971 | Buehler et al. ....................... 105/61 |
| 3,709,030 | 1/1973 | Aselman ............................. 340/261 |
| 3,733,598 | 5/1973 | Kato .................................... 340/261 |

Primary Examiner—Trygve M. Blix
Assistant Examiner—Reinhard J. Eisenzopf

[57] ABSTRACT

In a motor-driven rail vehicle, an arrangement is provided for sensing oscillations in the drive system occurring in a predetermined frequency range, and to reduce the torque of the motor if the oscillation amplitude sensed thereby exceeds a predetermined threshold value.

9 Claims, 4 Drawing Figures

OSCILLATION SENSITIVE VEHICLE MOTOR CONTROL

BACKGROUND OF THE INVENTION

1. Field of the Invention

The present invention relates to a means in a motor-driven rail-vehicle, comprising a drive wheel driven by a drive motor.

2. The Prior Art

FIG. 1 shows how in a rail-vehicle, the tractive force F varies with the difference $\Delta v$ between the peripheral speed of the drive wheel and the speed of the vehicle. To a relatively great extent the appearance of the curve depends on the surface of the rails and drive wheels, the existence of contamination, rust, ice, etc., and the speed of the vehicle. In principle, however, when the tractive force increases from zero up to a certain value $F_1$ then $\Delta v$ increases, due to elastic deformations, relatively slowly up to a certain value $\Delta v_1$. In a typical case $F_1$ is about 75 % of $F_{max}$. If the tractive force increases further, pronounced slipping occurs between wheels and rail. Maximum tractive force $F_{max}$ is obtained when $\Delta v = \Delta v_2$. $\Delta v_2$ is normally one or a few km/hour. If $\Delta v$ increases further, the tractive force decreases.

It is extremely desirable to be able to exploit the maximum available tractive force when necessary, i.e. to be able to work in a stable manner with $\Delta v = \Delta v_2$, where of course $F = F_{max}$. Since as mentioned above, the appearance of the curve, and thus both $\Delta v_2$ and $F_{max}$, vary relatively strongly with uncontrollable external conditions, it has so far been impossible to fulfil this desire. The invention now shows a means with the help of which this problem is solved in a simple and advantageous manner.

SUMMARY OF THE INVENTION

The invention is based on the fact that the operating range $\Delta v \geq \Delta v_2$ is in principle unstable since the derivative of F with respect to $\Delta v$ is zero or negative. Because of this, mechanical oscillations occur within this range in the system drive wheel – power transmission – drive motor – bogie. These oscillations have a natural frequency (possibly several) determined by the mechanical construction of the system. The existence of mechanical oscillations at such a natural frequency in the system thus constitutes an indication that the system is operating in the operating range $\Delta v \geq \Delta v_2$.

BRIEF DESCRIPTION OF THE DRAWINGS

The invention will now be described more fully with reference to the accompanying FIGS. 1–5. As already mentioned.

FIG. 3 an example of how the force transducer included in the means according to this embodiment can be positioned, and FIG. 4 the function of the limiting amplifier F 2 included in the system; while FIG. 5 shows a modified arrangement according to the invention.

FIG. 2 shows drive and control equipment for a drive motor M 1 in a rail-vehicle. The armature of the motor is supplied with direct current in known manner from an alternating voltage network connected to the output AC, over the controlled rectifier C 1. This emits a direct voltage, the magnitude of which is determined by the signal delivered from the amplifier F 3 to the control pulse device SPD. The motor is provided with a tachometer-generator TG which delivers a signal proportional to the motor speed $v$. This is compared in the circuit S 1 with a speed reference $v_{ref}$ obtained from the potentiometer P 1. The speed error thus obtained is supplied to an amplifier F 1 having a suitable characteristic, the output signal of which constitutes the reference value $I_{ref}$ for the motor current. $I_{ref}$ is supplied to a limiting amplifier F 2. This has the characteristic shown in FIG. 4. Its output signal $I_{ref}'$ is proportional to the input signal $I_{ref}$ if $I_{ref}$ is less than or equal to a limit value $\hat{I}$ set with the help of the potentiometer P 2. For $I_{ref} > \hat{I}$, then $I_{ref}' = \hat{I}$. Thus, with the help of P 2, the maximum tractive force and thus acceleration can be set. A current measuring device IM generates a signal I proportional to the motor current and this signal is compared with $I_{ref}'$ in the circuit S 2. The difference $I_{ref}'$ minus I constitutes the current error and is supplied over the current regulator F 3 to the control pulse device SPD of the convertor C 1. In a manner known per se, the control system now described will tend to keep the speed constant and equal to the value $v_{ref}$ set on the potentiometer P 1, while observing that the maximum motor current set with the help of P 2 (and therefore also the tractive force and acceleration) is not exceeded.

FIG. 3 shows a conventional bogie B in a motor-driven rail-vehicle. The bogie is seen from the side. It has two axles, each having two drive wheels mounted on the axle. The drive wheel 13 belongs to one of the axles, one bearing box 14 of which is shown. The bearing box is spring-suspended in the support 15 which is firmly joined to the bogie frame. The axle is driven by the motor M 1 which is suspended in the bogie frame, by means of the gear drive 12. The reaction force on the gear housing generated by the drive motor torque during acceleration is taken up by a reaction stay 16 applied between a bracket 17 on the bogie frame and a bracket 18 on the gear housing.

Figure 1:
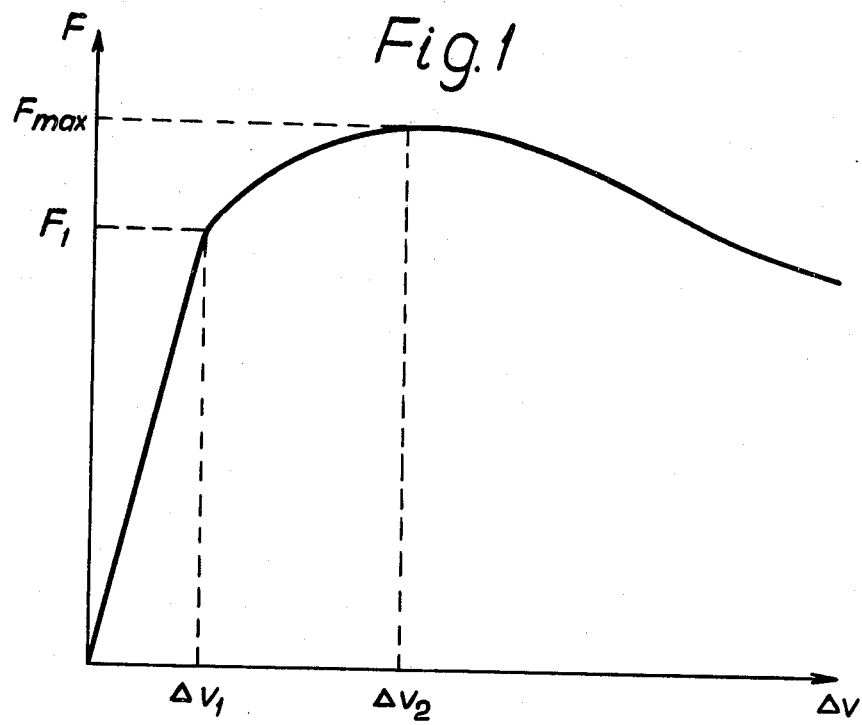
FIG. 1 shows the dependence of the tractive force on the relative speed between wheel and rail.

According to the invention a force transducer FT, preferably a magnetoelastic force transducer known per se, is arranged to be influenced by the force exerted on the reaction stay. The transducer may be applied in an aperture in the stay 16 or in one of the brackets 17 or 18. Alternatively, it may be applied between the bracket 17 and the bogie frame or between the bracket 18 and the gear housing 12. The transducer comprises in a known manner members which generate a direct voltage signal which is proportional to the force influencing the reaction stay 16 or its brackets. This signal is supplied to a band pass filter BP which is designed to let through signals having the frequency which has been found to appear in the case of mechanical oscillations of the type mentioned above. In a typical case this is a frequency of a few tens Hz. The output signal from the band pass filter is converted in a rectifier R to a direct voltage signal proportional to the oscillation amplitude, this signal then being supplied to a comparison device S 3. A threshold signal is obtained from the potentiometer P 3. The oscillation amplitude is compared with this threshold signal in S 3. If the oscillation amplitude exceeds the value corresponding to the threshold signal S 3 delivers a signal $\Delta \hat{I}$ over an amplifier F 4 to the limiting amplifier F 2 to decrease the voltage of the converter. The signal $\Delta \hat{I}$ decreases the limit value $\hat{I}$ set by P 2 to $\hat{I} - \Delta\hat{I}$. If the amplitude of the oscillations exceeds said threshold value, therefore, the current reference $I_{ref.}'$ will be limited to the value $\hat{I} - \Delta\hat{I}$. The armature current of the motor thus decreases correspondingly, and with it the tractive force, thus causing the oscillation amplitude to decrease. A closed controlled circuit is thus produced which, when high acceleration is desired, automatically ensures that the drive system operates at the point $F = F_{max}$; $\Delta v = \Delta v_2$ in FIG. 1. In this way the maximum adhesion available will be exploited to the full under all conditions.

Figure 2:
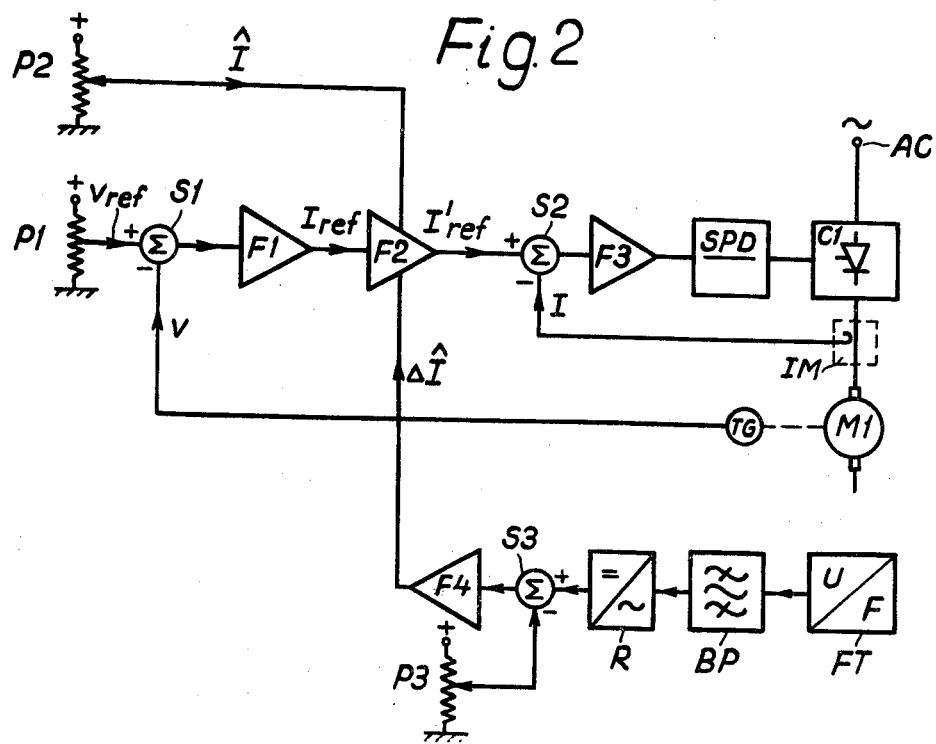
FIG. 2 shows one embodiment of a means according to the invention.

The threshold value with which the oscillation amplitude is compared in S 3 in FIG. 2 may be zero, and in this case P 3 and S 3 may be omitted. However, it is advisable with the help of P 3 to select a threshold value such that unwarranted reductions of the tractive force caused by minor oscillations are avoided. Similarly, it may be advisable in some cases to introduce a certain smoothing or delay in the signal path R – S3 – F4 – F2, so that brief oscillations are prevented from reducing the tractive force.

The force transducer used in the example may be placed at other points in the drive system or in the bogie frame. The most suitable location for each specific case depends on the design of the system motor – power transmission – drive wheel suspension which, as is known, may vary considerably. The important thing is that the transducer is placed at a point where it is subjected to the forces occurring during said mechanical oscillations.

Figure 3:
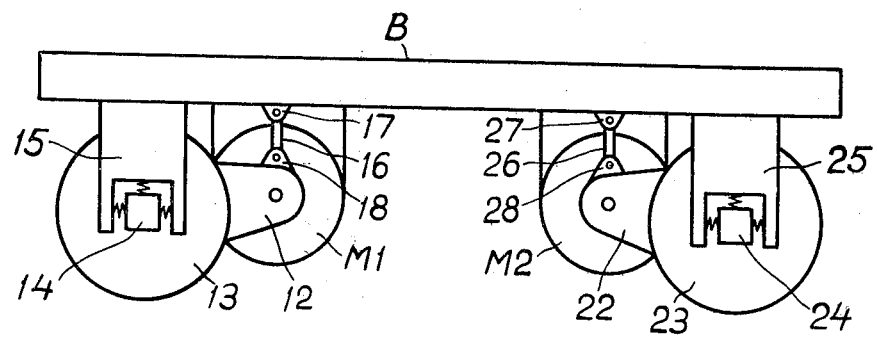
Figure 4:
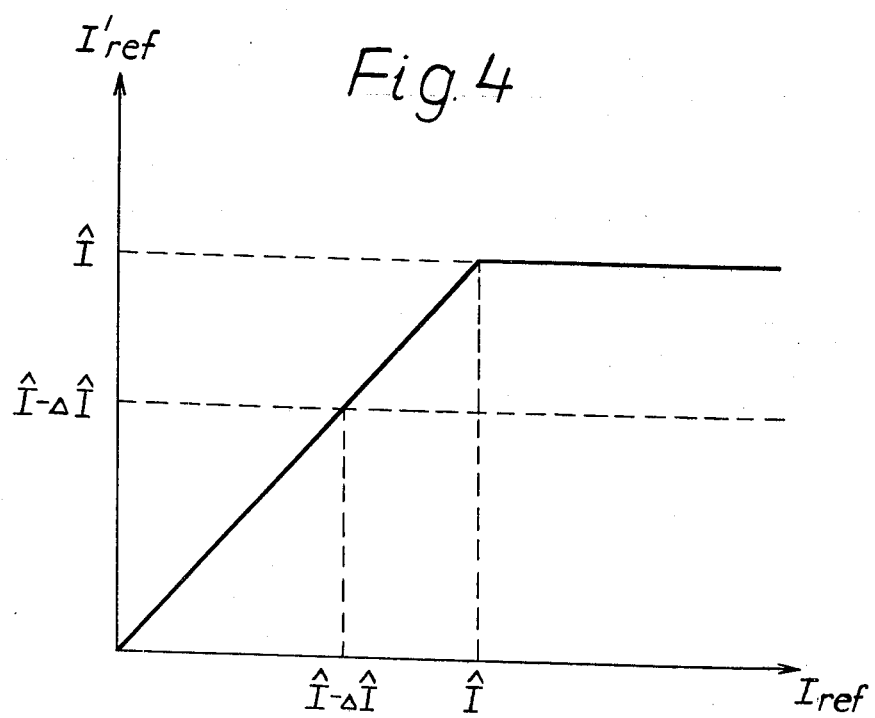

In FIG. 3 the bogie B is provided with a further pair of drive wheels 23 the bearing boxes 24 of which are suspended in the support 25. The axle is driven by the motor M2 through the gear 22 which is provided with a reaction stay 26 having brackets 27 and 28. The motor M 2 may be provided with its own control and supply system, identical to the motor M 1 shown in FIG. 2, in which case the force transducer is arranged in the same way in the reaction stay 26 or its brackets.

In certain cases the motors in the same bogie, or possibly all the motors in a vehicle, are driven from a common convertor. In this case each motor-drive axle is suitably provided with a force transducer, a band pass filter BP and a rectifier R. A selective circuit is then arranged to transmit the largest of the signals obtained from the rectifiers R to S 3. Usually the motor armatures are then supplied from the common convertor, whereas the field current of each motor can be controlled separately, for example by providing each motor with a separate controlled convertor to supply the field winding of the motor and a control circuit to control the field current of the motor. Thus each control circuit keeps the field current of the motor equal to a reference value supplied to the control circuit. Normally the control circuits are supplied with reference values of equal magnitude, corresponding to full motor flux at motor speeds from zero up to a certain value, the so-called basic speed, which might be, for example, half the full motor speed, and with increasing motor speed decreasing flux at speeds above said value.

When the motors exert a torque on the drive wheels, the distribution of pressure between the axles of the vehicle is altered so that the wheel pressure increases for certain driving axles and decreases for others. A certain axle or axles will therefore usually slip before the friction force available for the other axles is fully exploited. If, therefore, the slipping signal from the oscillation-sensing member of the spinning axle is made to decrease the armature current of all the motors by way of the selection circuit mentioned above and the common armature convertor, the drive torque on the axles which are not spinning will also decrease and the maximum drive torque will not be exploited.

In the system described, with common armature current control and individual field current control, however, this drawback can be avoided in the following manner.

The signal from each system motor - drive axle, which depends on the oscillation amplitude, is compared with a first threshold value. If the signal from a motor exceeds this value, it is supplied to the field current control circuits of the motors in the following manner: At speeds below the basic speed, the signal is supplied to the field current control circuits of the other motors (but not that of the slipping motor) in such a way that the field current in these motors is decreased by a value corresponding to the signal. The flux in these motors therefore decreases and their armature currents tend to increase. The common armature current regulator then counteracts this by reducing the armature voltage. This in turn results in the armature current, and thus the torque of the spinning motor, being decreased, the torque of the other motors remaining unaffected. At speeds above the basic speed the signal depending on the oscillation amplitude is supplied only to the field current control circuit of its own motor, and in such a way that the field current increases by a value corresponding to the signal. The flux in the motor then increases and the armature current, and thus the drive torque, decrease.

The result is that always and at all speeds the driving power of each motor will be the maximum possible with respect to the axle pressure of the drive axle coupled to the motor.

This system is suitably extended by supplying all the slipping signals to a selection circuit which transmits the largest of them on to a circuit where this signal is compared with a second threshold value which is greater than, for example twice as large as, the first threshold value mentioned above. If the signal exceeds this second threshold value, it is an indication that the armature current has been set far too high with respect to the adhesion prevailing and the signal is caused to influence the common armature current control circuit so that the armature current, and thus the tractive force of the whole vehicle, decreases to a value corresponding to the prevailing adhesion.

The magneto-elastic force transducer described in the example above may be replaced by force transducers of some other type, for example strain gauges. Instead of force transducers, other oscillation-sensing members may be used, for example accelerometers. In the bogie shown in FIG. 3 an accelerometer may suitably be applied at each end of the bogie.

The reduction in tractive force dependent on the oscillation amplitude can of course be obtained in many ways other than that described in connection with FIG. 2. For example, the signal $\Delta\hat{I}$ may instead be supplied to the comparison circuit S 2 and there subtracted from the current reference $I_{ref.}'$.

In a simplified embodiment of the invention, the output signal from the oscillation-sensing member is supplied to an indicator in the driver's cabin of the vehicle. When oscillations occur, therefore, the driver must adjust the tractive force manually. Even with this simplified system considerable improvements in tractive force can be achieved.

Another advantage with the system according to the invention is that it to a great extent reduces mechanical stresses on drive axles with wheels and suspension, on the bogie frame, motors and power transmission means, caused by uncontrolled oscillations.

In the example described above, the motors are DC motors supplied by controlled convertors. Of course the invention can also be used for vehicles having other types of motors and supply devices. Similarly the invention can obviously also be used with other designs of bogies wheel suspension and power transmission than those described above, for example bogies having more than two axles.

We claim:

1. In a motor-driven vehicle having at least one drive system which comprises a drive motor and drive wheels;
   in which system the tractive force varies with the difference $\Delta v$ between the peripheral speed of the drive wheel and the speed of the vehicle, in which the tractive force reaches a maximum at a value $\Delta v_2$ of said difference and decreases when said difference increases above said value, and in which, when said difference increases above said value, mechanical osciallations occur in the drive system within a certain natural frequency range;
   an oscillation sensing member which includes a means to sense mechanical osciallations in the system within such range and to form a signal corresponding to the amplitude of such osciallations;
   an arrangement for influencing the torque of the motor; and
   means to transmit such signal to said arrangement;
   said arrangement including means to reduce partially the torque of the motor in response to oscillations within such natural frequency range.

2. Means according to claim 1, in which the oscillation-sensing member comprises a transducer which is responsive to a magnitude, dependent on the oscillations to generate a signal corresponding to this magnitude.

3. Means according to claim 2, in which the oscillation-sensing member comprises a force transducer which is responsive to the reaction force caused by the drive force.

4. Means according to claim 2, in which the oscillation-sensing member comprises a band pass filter adapted to said frequency range, means to supply to the input of said band pass filter the output signal of the transducer, the output signal of said band pass filter being a measure of the amplitude of said oscillations.

5. In an arrangement according to claim 1, members for comparing the oscillation amplitude with a predetermined threshold value;
   said torque reducing means being responsive to an increase of the oscillation amplitude above said threshold value.

6. In a motor-driven vehicle having at least one drive system which comprises a drive motor and drive wheels;
   in which system the tractive force varies with the difference $\Delta v$ between the peripheral speed of the drive wheel and the speed of the vehicle, in which the tractive force reaches a maximum at a value $\Delta v_2$ of said difference and decreases when said difference increases above said value, and in which, when said difference increases above said value, mechanical oscillations occur in the drive system within a certain natural frequency range;
   an oscillation sensing member which includes means to sense mechanical oscillations in the system within such range and to form a signal corresponding to the amplitude of such oscillations;
   an indicator; and
   means to transmit such signal to said indicator.

7. Means according to claim 6, comprising members for comparing the oscillation amplitude with a predetermined threshold value.

8. A method for controlling the tractive force in a motor-driven vehicle having at least one drive system which comprises a drive motor and drive wheels;
   in which system the tractive force varies with the difference $\Delta v$ between the peripheral speed of the drive wheel and the speed of the vehicle, in which the tractive force reaches a maximum at a value $\Delta v_2$ of said difference and decreases when said difference increases above said value, and in which, when said difference increases above said value, mechanical oscillations occur in the drive system within a certain natural frequency range;
   said method comprising
   sensing mechanical oscillations within such range;
   forming a signal corresponding to the amplitude of such oscillations;
   and
   partially reducing the torque of the motor in response to oscillations within such natural frequency range.

9. A method according to claim 8, including;
   comparing the oscillation amplitude with a predetermined threshold value; and
   partially reducing the torque of the motor in response to an increase of the oscillation amplitude above said threshold value.

* * * * *